US012612236B2

(12) United States Patent
Li

(10) Patent No.: US 12,612,236 B2
(45) Date of Patent: Apr. 28, 2026

(54) DISPENSING APPARATUS

(71) Applicant: The Oxygen Confectionery Corp., Wilmington, DE (US)

(72) Inventor: Yang Li, Mississauga (CA)

(73) Assignee: Enjovo Corp., Wilmington, DE (US)

( * ) Notice: Subject to any disclaimer, the term of this patent is extended or adjusted under 35 U.S.C. 154(b) by 0 days.

(21) Appl. No.: 17/598,875

(22) PCT Filed: Apr. 6, 2020

(86) PCT No.: PCT/US2020/026833

§ 371 (c)(1),
(2) Date: Sep. 28, 2021

(87) PCT Pub. No.: WO2020/206412

PCT Pub. Date: Oct. 8, 2020

(65) Prior Publication Data

US 2024/0025627 A1 Jan. 25, 2024

(51) Int. Cl.

| | |
|---|---|
| ***B65D 83/04*** | (2006.01) |
| ***A61J 1/03*** | (2023.01) |
| ***A61J 7/00*** | (2006.01) |
| ***B65D 85/60*** | (2006.01) |

(52) U.S. Cl.

CPC ............ *B65D 83/0409* (2013.01); *A61J 1/03* (2013.01); *A61J 7/0076* (2013.01); *B65D 85/60* (2013.01); *B65D 2583/0481* (2013.01)

(58) Field of Classification Search

CPC ................ B65D 83/0409; B65D 85/60; B65D 2583/0481; B65D 2583/0422; A61J 1/03; A61J 7/0076

See application file for complete search history.

(56) References Cited

U.S. PATENT DOCUMENTS

| | | | | |
|---|---|---|---|---|
| 2,669,349 A | 2/1954 | Silver | | |
| 5,174,471 A * | 12/1992 | Kozlowski | B65D 83/0409 221/202 | |
| 10,343,836 B2 * | 7/2019 | Li | B65D 85/60 | |
| 10,351,333 B2 * | 7/2019 | Li | B65D 85/60 | |
| 10,889,426 B2 * | 1/2021 | Li | B65D 83/0409 | |
| 2016/0130071 A1 | 5/2016 | Li | | |
| 2019/0092557 A1 * | 3/2019 | Li | B65D 85/60 | |

FOREIGN PATENT DOCUMENTS

| | | |
|---|---|---|
| EP | 1002745 A1 | 5/2000 |
| GB | 2358627 A | 8/2001 |

OTHER PUBLICATIONS

Aug. 18, 2020—(WO) International Search Report and Written Opinion—Appl No. PCT/US2020/026833, 14 pages.

* cited by examiner

*Primary Examiner* — Michael Collins

(74) *Attorney, Agent, or Firm* — Banner & Witcoff, Ltd.

(57) ABSTRACT

A dispenser apparatus may include a housing and a delivering structure at least partially enclosed by the housing. The dispenser apparatus may dispense desired sizes or pieces of tablets, pills candy, mints, chewing gum or the like. The dispenser apparatus is refillable when a cover or lid is open. The dispenser has an adjust apparatus which is used to change a carrying holder dimension and the control apparatus of the adjust apparatus hiding in the dispenser in a stowed configuration and showed out of the dispenser in a dispensing configuration.

6 Claims, 18 Drawing Sheets

A

B

DISPENSING APPARATUS

CROSS-REFERENCE TO RELATED APPLICATION

This application is a U.S. National Phase Entry of International Application No. PCT/US2020/026833 filed Apr. 6, 2020, designating the United States of America and claiming priority to U.S. Provisional Patent Application No. 62/830,220 filed Apr. 5, 2019. The present application claims priority to and the benefit of the above-identified applications, and the above-identified applications are incorporated by reference herein in their entirety and made part hereof.

TECHNICAL FIELD

The present disclosure relates generally to a pocket dispensing apparatus which is able to dispense different desired sizes or pieces of small items such as candy, chewing gum, mint, chocolate bin, tablets or pills etc.

BACKGROUND

Many people daily require or consume tablets, pills, mints, candies, or the like. Existing dispenser apparatuses are not convenient to dispense these objects and may present difficulties in such dispensing. For example, people sometimes want to consume a smaller sized candy. At other times, they may desire a larger sized object such as chewing gum. Additionally, there are times when precise dispensing may be required, such as when dispensing pills, and other times when dispensing can be less precise, such as when a user is dispensing candy. Existing dispenser apparatuses are not well-suited to fulfill these requirements. Moreover, many existing dispensers are not designed to be reusable, contributing to waste. Accordingly, there is a need for a dispenser apparatus that addresses one or more of the abovementioned deficiencies. The present disclosure is provided to address this need and other needs in existing dispensing apparatuses. A full discussion of the features and advantages of the present invention is deferred to the following detailed description, which proceeds with reference to the accompanying drawings.

BRIEF SUMMARY

Aspects of the disclosure relate to a pocket dispensing apparatus which is able to dispense different desired sizes or pieces of small items such as candy, chewing gum, mint, chocolate bin, tablets or pills etc., which includes various features. According to one aspect, the adjust apparatus control button can hide in the dispenser in the stowed configuration and be out of the dispenser in the dispensing configuration for consumer to change the dimension of carrying holder. According to another aspect, in order to enlarge the storage chamber for carrying more pills or tablets, the present disclose use some means to decrease the length of a delivering structure in the stowed configuration, such as use the elastic material, roll up configuration, layers pile up, or multiple continuing folds baffle or the like, etc.

Aspects of the disclosure relate to an apparatus configured to dispense one or more small items, the apparatus including a container having a storage chamber configured to hold the one or more small items, and a delivery member including a carrying holder and a control apparatus, where the delivery member is configured to move in a reciprocating motion between a stowed configuration and a dispensing configuration by exertion of an exterior force. The control apparatus is configured to be engaged by a user to adjust at least one dimension of the carrying holder. When the delivery member is in the stowed configuration, the carrying holder and the control apparatus are positioned within the container, and when the delivery member is in the dispensing configuration, the carrying holder and the control apparatus are positioned outside of the container so that the user can engage the control apparatus to adjust the at least one dimension of the carrying holder.

According to one aspect, the apparatus also includes a funnel apparatus positioned within the container. When the delivery member is in the stowed configuration, the funnel apparatus is configured to permit the one or more small items to move through the funnel apparatus into the carrying holder of the delivery member. The delivery member further includes a push button configured for pushing the delivery member to the dispensing configuration.

According to another aspect, the dispensing apparatus includes a holder adjusting apparatus, and the control apparatus engages the holder adjusting apparatus to adjust the at least one dimension of the carrying holder.

According to a further aspect, the apparatus includes a biasing mechanism biasing the delivery member to the stowed position.

Additional aspects of the disclosure relate to an apparatus configured to dispense one or more small items, the apparatus including a container having a storage chamber configured to hold the one or more small items, and a delivery member including a carrying holder and a control apparatus. The delivery member is configured to move in a reciprocating motion between a stowed configuration and a dispensing configuration. The control apparatus is configured for adjusting at least one dimension of the carrying holder when an exterior force is exerted on the control apparatus.

According to one aspect, the carrying holder is formed by two or more parts, and the control apparatus is configured to engage the carrying holder to adjust the at least one dimension of the carrying holder.

According to another aspect, at least a portion of the carrying holder is formed by an elastic material, and the control apparatus engages the carrying holder to adjust the at least one dimension of the carrying holder.

Further aspects of the disclosure relate to a dispensing apparatus configured to dispense one or more small items, the apparatus including a container having a storage chamber configured to hold the one or more small items, a delivery member including a carrying holder, and a baffle apparatus. The delivery member is configured to move in a reciprocating motion between a stowed configuration and a dispensing configuration. The baffle apparatus is configured to follow the carrying holder such that when the delivery member moves from the stowed configuration to the dispensing configuration, the baffle apparatus is configured to extend to a long configuration, and when the delivery member moves from the dispensing configuration to the stowed configuration, the baffle apparatus is configured to retract to a short configuration.

According to one aspect, the apparatus includes a funnel apparatus positioned within the container. When the delivery member is in the stowed configuration, the funnel apparatus is configured to permit the one or more small items to move through the funnel apparatus into the carrying holder of the delivery member. The delivery member also includes a push button configured for pushing the delivery member to the dispensing configuration.

According to another aspect, the apparatus includes a cover hingedly coupled to the storage chamber, where opening the cover allows for refilling the one or more small items into the storage chamber.

According to further aspects, the baffle apparatus is configured for extending and retracting by: expanding and contracting in length elastically, rolling and unrolling, folding and unfolding, or sliding, among other mechanisms.

Still further aspects of the disclosure relate to an apparatus configured to dispense one or more small items, the apparatus including a container having a storage chamber configured to hold the one or more small items and an exit opening in communication with the storage chamber, and a delivery member including a carrying holder configured for receiving the one or small items, an adjusting apparatus configured to move between a plurality of positions to adjust at least one dimension of the carrying holder, and a control apparatus connected to the adjusting apparatus and configured to be engaged by a user to move the adjusting apparatus between the plurality of positions. The delivery member is configured to move in a reciprocating motion between a stowed configuration, where the carrying holder is within the container and configured to receive the one or more small items from the storage chamber, and a dispensing configuration, where the delivery member extends through the exit opening and the carrying holder is configured to dispense the one or more small items, by exertion of an exterior force by the user.

According to one aspect, when the delivery member is in the stowed configuration, the carrying holder and the control apparatus are positioned within the container, and when the delivery member is in the dispensing configuration, the carrying holder and the control apparatus are positioned outside of the container so that the user can engage the control apparatus to adjust the at least one dimension of the carrying holder.

Yet additional aspects of the disclosure relate to an apparatus configured to dispense one or more small items, the apparatus including a container having a storage chamber configured to hold the one or more small items, and an exit opening in communication with the storage chamber, and a delivery member including a carrying holder configured for receiving the one or small items. The delivery member is configured to move in a reciprocating motion between a stowed configuration, where the carrying holder is within the container and configured to receive the one or more small items from the storage chamber, and a dispensing configuration, where the delivery member extends through the exit opening and the carrying holder is configured to dispense the one or more small items, by exertion of an exterior force by the user. The apparatus further includes a baffle apparatus having a first portion connected to the delivery member and a second portion connected to the container, where the first portion is connected to the delivery member and configured to follow the delivery member, such that when the delivery member moves from the stowed configuration to the dispensing configuration, the baffle apparatus is configured to extend to a long configuration, and when the delivery member moves from the dispensing configuration to the stowed configuration, the baffle apparatus is configured to retract to a short configuration.

According to further aspects, the baffle apparatus is configured for extending and retracting by: expanding and contracting in length elastically, rolling and unrolling, folding and unfolding, or sliding, among other mechanisms.

Other aspects of the disclosure relate to an apparatus configured to dispense one or more small items, the apparatus including a container having a storage chamber configured to hold the one or more small items and an exit opening in communication with the storage chamber, and a delivery member including a carrying holder configured for receiving the one or small items, an adjusting apparatus configured to move between a plurality of positions to adjust at least one dimension of the carrying holder. The delivery member is configured to move in a reciprocating motion between a stowed configuration, where the carrying holder is within the container and configured to receive the one or more small items from the storage chamber, and a dispensing configuration, where the delivery member extends through the exit opening and the carrying holder is configured to dispense the one or more small items, by exertion of an exterior force by the user.

Other features and advantages of the disclosure will be apparent from the following description taken in conjunction with the attached drawings.

BRIEF DESCRIPTION OF THE DRAWINGS

To complete understand the present disclosure and features and advantages thereof, referencing the provided following description when read in conjunction with the companying figures, background, technical field of the disclosure, and headings. In the present disclosure and different figures, the identical numerals and/or letters may be repeated should be considered as the same element or a functionally equivalent element.

DETAILED DESCRIPTION

Figure 1:
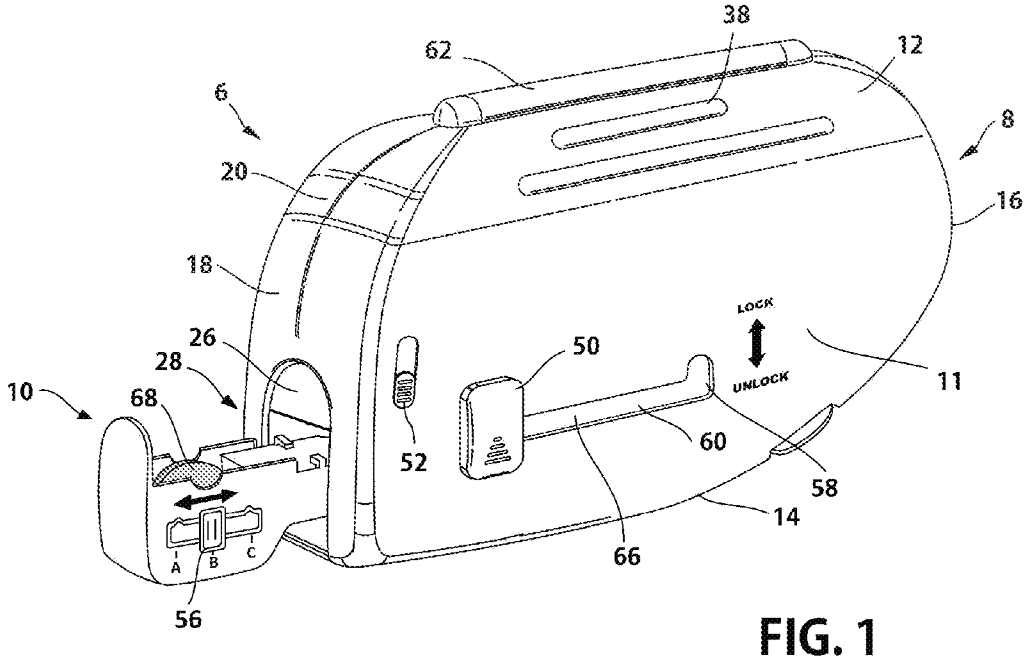
FIG. 1 is a perspective view illustrating an aspect of a dispenser apparatus in a dispensing configuration.

It is to be understood that the present disclosure is not limited to the details of the description, and various other modifications and applications can be considered. Further changes of the device, design, configuration or methods will be made to those skilled in the art without deviating from the true spirit of the scope of the disclosure herein described, therefore, the detail of description in the disclosure should be interpreted as illustration not to limit the scope of the invention. Additionally, it would be recognized that the present disclosure is not limited to a particular kind or shape of tablets or pills and it is to be understood that throughout the specification and claims the term "tablets or pills" is used to include capsules, chewing gum, mint, candy or various small piece of confections or any other objects which may be dispensed from the apparatus. This disclosure incorporates by reference U.S. patent application Ser. No. 16/121,585, filed Sep. 4, 2018, titled DISPENSING CONTAINER.

In one aspect of the present disclosure, a dispenser apparatus may comprise a delivering structure and a housing. The delivering structure may comprise a carrying holder and a baffle apparatus which connect the carrying holder. In a non-use or stowed configuration, the delivering structure may be situated in the housing, whereas in a use or dispensing configuration, a carrying holder of the delivering structure is moved out of the housing for dispensing tablets or pills. A holder exit may be disposed on the housing, and the delivering structure may reciprocate between the stowed configuration and the dispensing configuration through the holder exit.

There are some means to change the dimension of the carrying holder for carrying different desired size or different pieces of the tablets or pills. Firstly, the delivering structure may comprise an adjusting apparatus which may be configured to change at least one dimension of the carrying holder. The adjusting apparatus may comprise a control apparatus which is situated in the housing when in the stowed configuration. The control apparatus of the adjusting apparatus may move out of the housing through the holder exit with the carrying holder from the stowed configuration to the dispensing configuration for consumer actuating it to change the dimension of the carrying holder, and the control apparatus may retreat back into housing with the carrying holder through the holder exit from the dispensing configuration to the stowed configuration. Furtherly, the carrying holder may be formed by two pieces of apparatus, and each piece of apparatus may seem like part of the carrying holder, and these two pieces of apparatus partly pile up together to form the carrying holder, a control apparatus may engage the two pieces of apparatus to change the dimension of the carrying holder. Additionally, part of the carrying holder sidewalls may be formed of the elastic or flexible material, such as soft plastic any rubber, etc. and a control apparatus may engage the elastic and flexible sidewalls of the carrying holder to extend or contract to change the dimension of the carrying holder.

In yet another aspect of the present disclosure, a funnel apparatus and the baffle apparatus of the delivering structure, or the funnel apparatus and a barrier apparatus, or the funnel apparatus and part of the baffle apparatus of the delivering structure and the barrier apparatus are defined between two opposite sides of the dispenser apparatus, and they may divide the housing into an upper chamber and a lower chamber. The upper chamber may be used as a storage chamber to storage the tablets or pills, and the lower chamber may be as the rest chamber and the delivering structure is situated in the rest chamber when in the stowed configuration. The baffle apparatus of the delivering structure may direct the tablets or pills from the storage chamber through the funnel apparatus into the carrying holder of the delivering structure in the stowed configuration.

In order to reduce the length of delivering structure or the rest chamber and enlarge the space of the storage chamber for carrying more tablets and pills, the baffle apparatus of the delivering structure may contract, roll up, folded or pile up etc. in the stowed configuration and may extend or stretch or unfold etc. when an external force actuates the delivering structure to move from the stowed position to the dispensing position. For example, part of the baffle apparatus may be formed of the elastic and flexible material, such as soft plastic, any rubber, thin metal, nature or synthetic material etc., when an external force engages the delivering structure, and the baffle apparatus may extend to the dispensing position, and when the external force is moved it may contact back to the stowed configuration. Furthermore, the baffle apparatus can be disposed of a roll up configuration, like the self-retracting measure tape, one distal tip connect the carrying holder, another distal tip disposed on the dispenser, and other part may be rolled up, when an external force engages the delivering structure, the baffle apparatus may stretch to the dispensing position, and when the external force is removed the baffle apparatus may roll back and engage the carrying holder retreat back to the stowed position. Additionally, the baffle apparatus may be configured like a multi slid doors, two or more parts of the baffle apparatus may pile up together in the stowed position, and slide stretch to the dispensing position. Furthermore, the baffle apparatus may be configured like an accordion door, which may be continuing folded together in the stowed position and stretch in the dispensing position.

The funnel apparatus may comprise several transverse or obliquely vertical or slope bodies positioned on at least one side of the housing, and which are disposed between the storage chamber and the carrying holder so as to facilitate rolling or other movement of the tablets or pills from the storage chamber into the carrying holder fluently or in alignment in the stowed configuration. Additionally, at least one side of the dispenser apparatus may be curved to form the funnel apparatus between the storage chamber and the carrying holder of the delivering structure so as to facilitate transfer of the tablets or pills roll from the storage chamber into the carrying holder fluently or in alignment in the stowed configuration. Furtherly, the funnel apparatus may be disposed by a decline plate disposed on one side or both sides of the dispenser apparatus.

A button connected to the delivering structure has a first detent or other means to prevent the delivering structure from unintended movement in the stowed configuration, and a second detent or other means to halt the delivering structure at the dispensing position to actuate the control apparatus to adjust the dimension of the carrying holder for carrying different desired sizes or pieces of the tablets and pills.

In order to reduce or eliminate the noise occurred by the tablets or pills collide the sidewalls of the dispenser, a thin layer of soft plastic, rubber, nature or synthetic material etc. may be coated or sprayed on the inside of the dispenser.

Additionally, it is within the teachings of the present disclosure that the dispenser apparatus may be formed from any suitable material, such as but not limited to plastic, synthetic, metal, rubber, natural or any other suitable materials, and the dispenser apparatus may be transparent or opaque.

FIG. 1 illustrates the dispenser apparatus 6 in a dispensing configuration. The dispenser apparatus 6 may include a delivering structure 10 and a housing 8 at least partially enclosing the delivering structure 10. It should be understood by those of skill in the disclosure that the housing 8 may be formed by single or multiple elements separately or integrally formed. For example, the housing 8 may have a front cover 11 and a back cover 9, a top 12 and a bottom 14, a right end wall 16 and a left end wall 18. A corner 20 between the left end wall 18 and the top 12 may be rounded, cut or the like, etc., which may prevent the dispenser apparatus 6 from colliding with a user's mouth when the user retrieves tablets or pills from the dispenser apparatus 6. One or more of the front cover 11 and back cover 9, the top 12 and the bottom 14, the right end wall 16 and left end wall 18 may be curved in order to enlarge the dispenser inside capacity or facilitate comfort for a user. In alternative aspects, the housing 8 may have other suitable configurations that permit the functionality described herein. For example, the housing 8 may be configured as a cube, sphere, cylinder, etc. Additionally or alternatively, the housing may be configured in the shape of an animal, cartoon character, etc., which may attract the attention of a child or other user.

As shown in FIG. 1, a holder exit 28 is configured on the left wall 18 adjacent the bottom 14. The delivering structure 10 may be configured for reciprocating motion between a stowed configuration (see FIG. 2) and the dispensing configuration through the holder exit 28. Additionally, a push button 50 may be formed with or otherwise operatively coupled to the delivering structure 10, such that a user may push the button 50 forward to engage the delivering structure 10 to move it from the stowed configuration to the dispensing configuration. In one aspect, an adjusting plate 26 may be disposed proximate the holder exit 28, and a push button 52 may engage the adjusting plate 26 to move the plate 26 up or down for changing the dimension of the holder exit 28, e.g., to prevent extraneous tablets or pills 68 from rolling out of the holder exit 28 when a user operates the apparatus 6. To enhance a user's grip, ridges or stripes 38 may be configured on the top 12 of the housing 8. The ridges 38 may be formed as an over-molded element having a softer or lower durometer hardness than the housing 8, and it is to be understood that the ridges 38 may have any configuration that provides the intended functionality. For example, the ridges 38 may be sinusoidal, may be comprised of a plurality of touching linear segments, etc.

Figure 2:
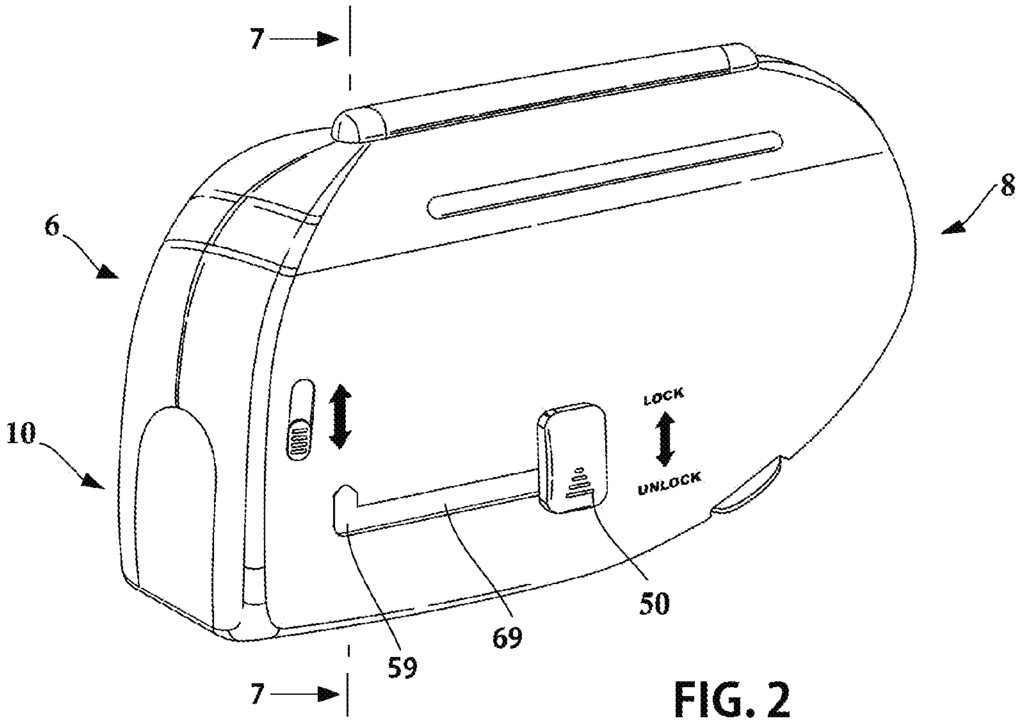
FIG. 2 is a perspective view illustrating the dispenser apparatus of FIG. 1 in a stowed configuration.

As shown in FIG. 2, the dispenser apparatus 6 is in a stowed configuration, with the delivering structure 10 positioned in the housing 8. The push button 50 and the groove 69 may have a first detent or other means 58 (see FIG. 1) and a second detent or other means 59. The first detent 58 is used to prevent the delivering structure 10 from unintended movement when the dispenser apparatus is in the stowed configuration. The push button 50 may be pushed up along the detent means 58 to a lock position so that the delivering structure 10 cannot be engaged. When the delivering structure 10 is desired to be actuated, the push button 50 then may be pushed down to the unlock position, separating the push button 50 from the detent 58. The second detent 59 is used for halt the delivering structure 10 at the dispensing configuration.

Figure 3A:
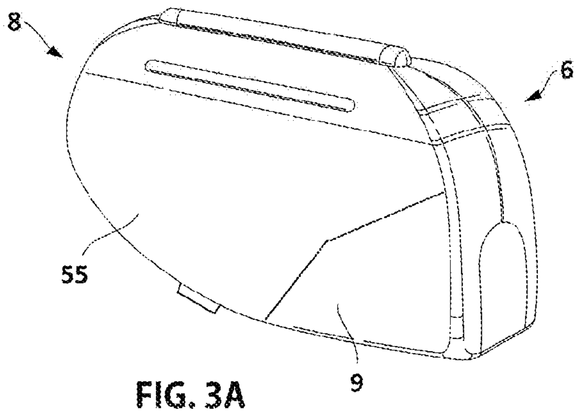
FIG. 3A is a perspective view illustrating the reverse side of the dispenser apparatus of FIG. 1 in the stowed configuration.
Figure 3B:
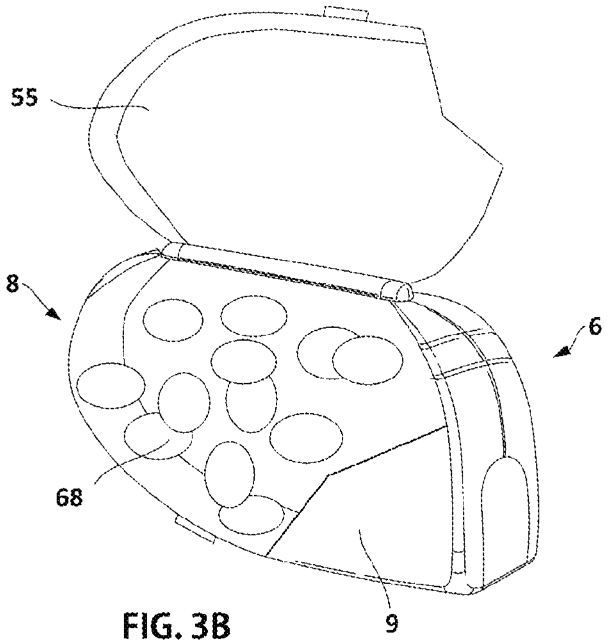
FIG. 3B is a perspective view illustrating the reverse side of the dispenser apparatus of FIG. 1 in the stowed configuration and with a lid open.
Figure 3C:
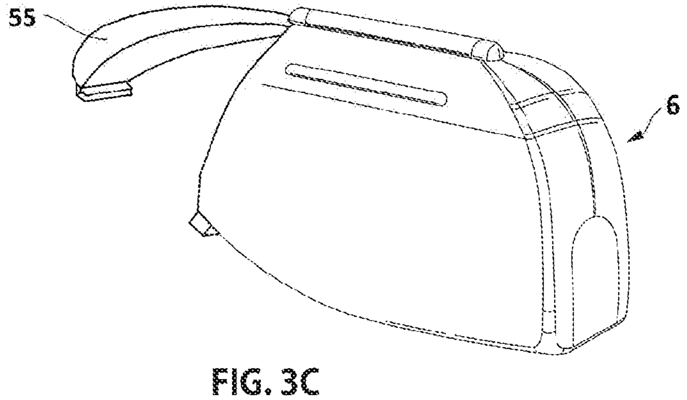
FIG. 3C is a perspective view illustrating the reverse side of the dispenser apparatus of FIG. 1 in the stowed configuration and with a tail lid open.

As shown in FIGS. 3A and 3B, the dispenser apparatus 6 may have a lid 55 disposed on the back cover 9 of the housing 8 and may be hinged on the top 12 of the housing 8. In FIG. 3A, the lid 55 is in a closed position. In FIG. 3B, the lid 55 is in an open position. Thus, a user may refill the tablets or pills 68 by opening the lid 55. The lid 55 may be made of the same material as the other parts of the dispenser apparatus 6. Furthermore, in the FIG. 3C, the lid 55 may be configured on the third side wall 16, and hinged on the dispenser. Additionally or alternatively, the lid 55 may be made of a material with transparency so that the user can see how many pieces of tablets or pills are in the dispenser apparatus 6. Further, the lid 55 may include material that can emit light or glow in the dark so that the dispenser apparatus 6 can be easily located during night or in a dark room.

Figure 4A:
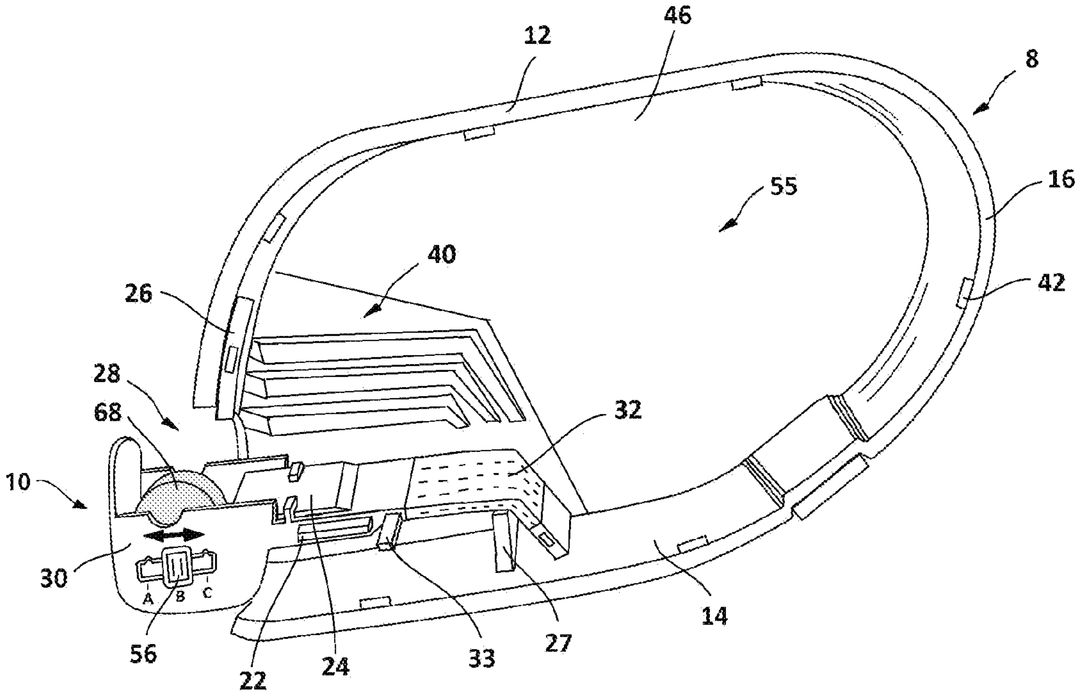
FIGS. 4A-4B are perspective view illustrating the inner side of left-half and right-half parts of the dispenser apparatus of FIG. 1.
Figure 8:
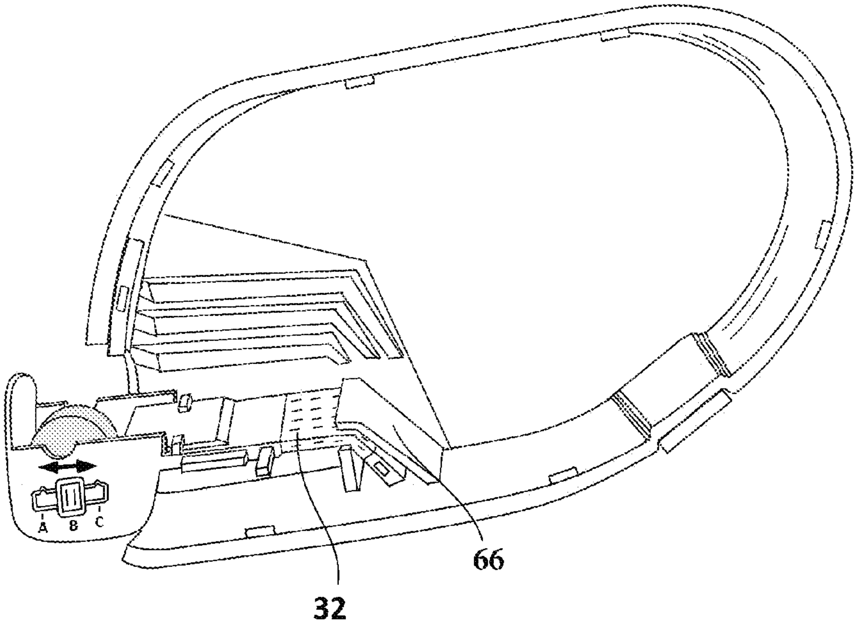
FIG. 8 is a perspective view illustrating the inner side of left-half parts of the dispenser apparatus of FIG. 1 with a barrier apparatus

As shown in FIG. 4A, the housing 8 may have a first side and a second side that couple to one another to define the interior of the housing therein, and the delivering structure 10 may reciprocate between the two sides. In one aspect, the delivering structure 10 may include a carrying holder 30, a baffle apparatus 32, and an adjusting apparatus 24. The carrying holder 30 is used for holding and carrying the tablets or pills 68 and the rear of the carrying holder 30 may include or couple to the baffle apparatus 32. Part or all of the baffle apparatus 32 may be formed of the elastic and flexible material, such as soft plastic, rubber, nature or synthetic material, and when an external force actuate it, and it may extend or stretch, and when the external force is removed or canceled it may contract back. The adjusting apparatus 24 may be disposed on the delivering structure 10 to change the inside dimension of the carrying holder 30 so that the dispenser apparatus 6 may dispense various sizes or intended pieces of tablets or pills 68. Additionally, as shown in FIG. 8, a barrier apparatus 66 may extend between the first and second side, situated over the baffle apparatus 32 in the stowed configuration help to direct the tablet or pill 68 from the storage chamber 55 to the carrying holder 30

As shown in FIG. 4A, a funnel apparatus 40 and the baffle apparatus 32 collaborate to divide the housing 8 into an upper chamber and a lower chamber. The upper chamber may be used as the storage chamber 55 to store the tablets or pills 68, and the delivering structure 10 may be situated in the lower chamber in the stowed configuration.

Figure 5A:
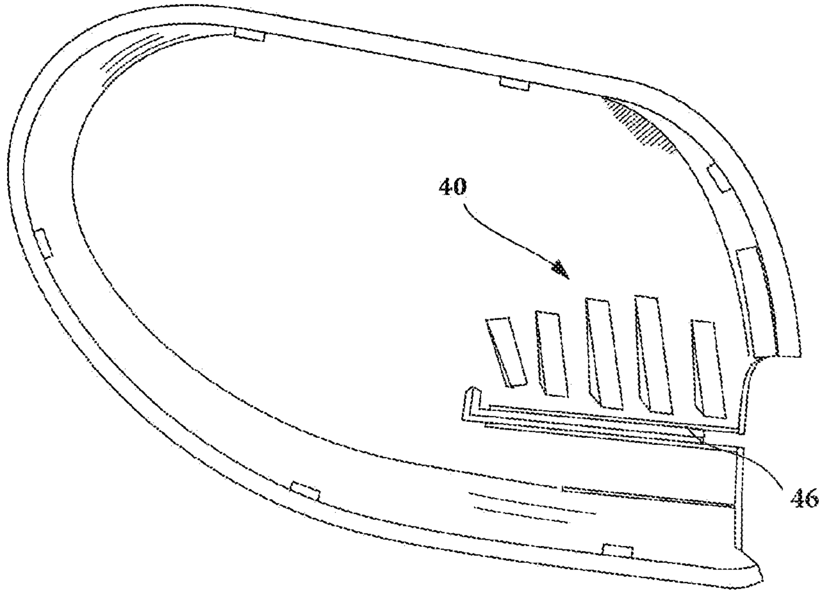
FIG. 5A-5B arm perspective view of the inner side of left-half and right-half parts illustrating another aspect of a funnel apparatus.
Figure 7A:
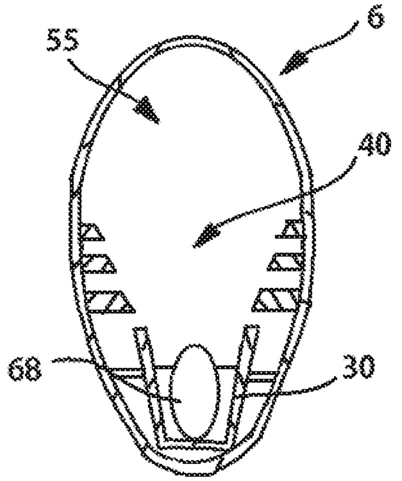
FIG. 7A is a simple cross-sectional view taken along line 7-7 of FIG. 2 illustrating an aspect of the funnel apparatus of the dispenser apparatus.
Figure 7B:
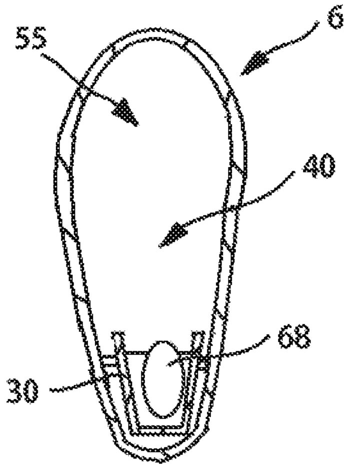
FIG. 7B is a simple cross-sectional view taken along line 7-7 of FIG. 2 illustrating the funnel apparatus formed by two curved sidewalls of the dispenser apparatus.
Figure 7C:
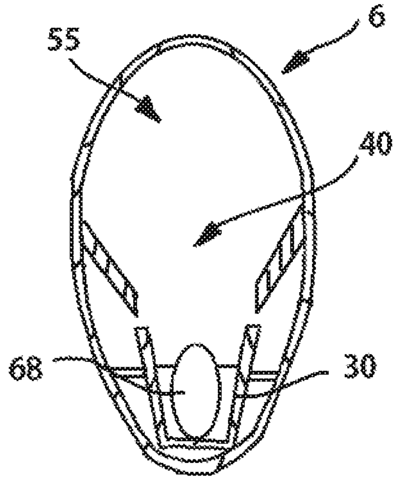
FIG. 7C is a simple cross-sectional view taken along line 7-7 of FIG. 2 illustrating the funnel apparatus formed by two decline plates.
Figure 7D:
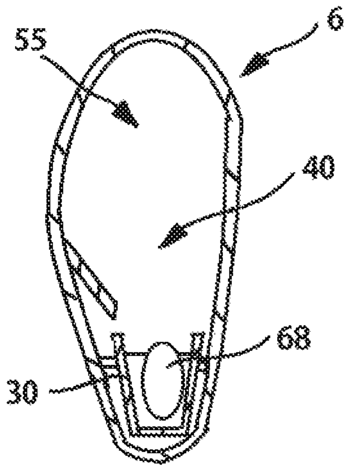
FIG. 7D is a simple cross-sectional view taken along line 7-7 of FIG. 2 illustrating the funnel apparatus formed by one decline plat and another sidewall of the dispenser apparatus.

As shown in FIG. 7A, because the storage chamber 55 is configured between two sides of the housing 8, and the dimension between the two sides is bigger than the width of the carrying holder 30, the dispenser apparatus 6 may include the funnel apparatus 40 to facilitate rolling or other funneling of the tablets and pills from the storage chamber 55 into the carrying holder 30 when in the stowed configuration. It is within the teachings of the present disclosure that the funnel apparatus 40 may have any suitable configurations and manners for the intended functionality. For example, in one aspect, some transverse or obliquely vertical or slope bodies (see FIGS. 4A and B) may be disposed on at least one side of the housing 8, such that the sides or edges of the bodies define the funnel apparatus 40 (see FIG. 7A) between the storage chamber 55 and the carrying holder 30. In another aspect, as shown in FIGS. 5A and B, the funnel apparatus 40 may be defined by other obliquely vertical or slope bodies, without the use of transverse bodies. In still another aspect, as shown in FIG. 7B, the curved, sloping two sides of the housing 8 may compose the funnel apparatus 40 between the storage chamber 55 and the carrying holder 30. In yet another aspect, the funnel apparatus 40 may be formed of a decline plate arranged on at least one sidewall of the dispenser, as shown in the FIGS. 6A, 6B, 7C and 7D.

Figure 4B:
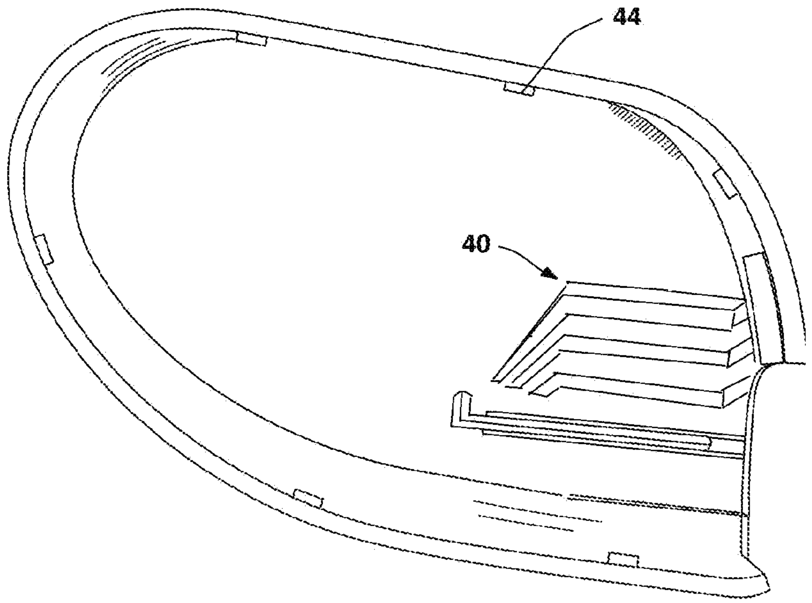

As shown in FIG. 4, the adjusting plate 26 may be disposed proximate the holder exit 28, and a button 52 (see FIG. 1) engages the adjusting plate 26 to change the dimension of the holder exit 28 in order to prevent different sizes of tablets or pills from rolling out of the holder exit 28 when a user operates the dispenser apparatus 6. Additionally, In order to assemble the housing 8, snap fit engaging members 42 and receiving ports 44 are provided on the two sides of the housing 8. The snap fit engaging members 42 may engage the receiving ports 44 to maintain the housing 8 in the closed position.

As shown in FIGS. 1, 2 and 4, the control button 56 of the adjusting apparatus 24 may company with the holder 30 situated in the housing 8 in the stowed configuration, and when consumer engages the delivering structure 10 forward to the dispensing configuration, the control button 56 may company with the carrying holder 30 move out of the housing 8 through the holder exit 28 to the dispensing configuration, and then the consumer may push the push button 50 to the second detent position 59 (see FIG. 2) to halt the delivering structure 10 in the dispensing position, and then the consumer actuates the control button 56 to engage the adjusting apparatus 24 to adjust the dimension of the carrying holder 30 for carrying different desired sizes or pieces of tablets or pills. After change the dimension of the carrying holder 30, the consumer engages the push button 50 to release the detent and free the delivering structure 10, and then the control button 56 may company with the carrying holder 30 automatically retreat back in the housing 8 through the holder exit 28 to the stowed configuration (see FIG. 2).

Figure 5B:
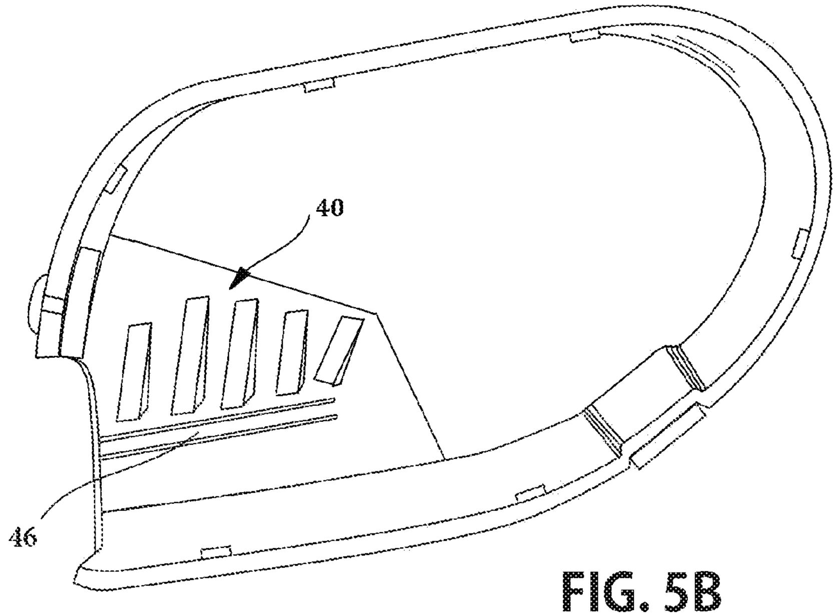
Figure 6A:
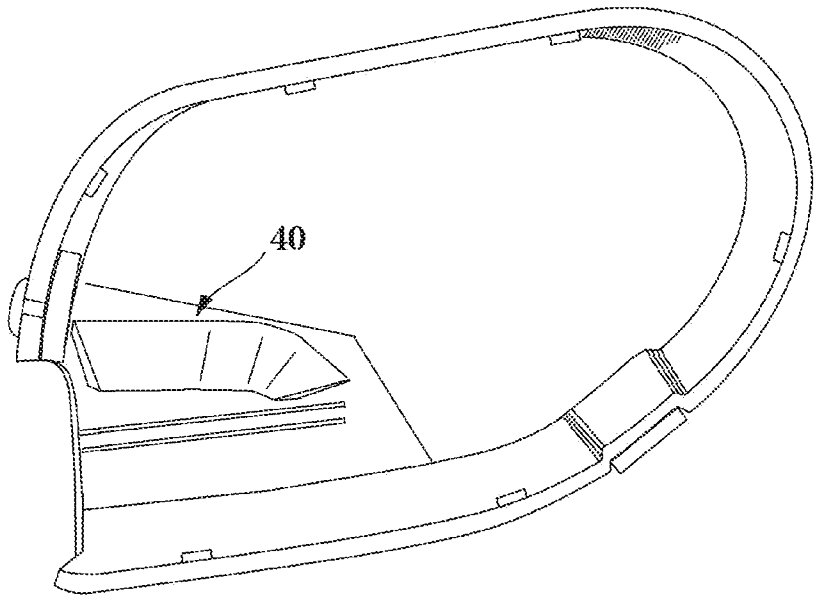
FIGS. 6A-6B are perspective view of the inner side of left-half and right-half parts illustrating still another aspect of a funnel apparatus.
Figure 6B:
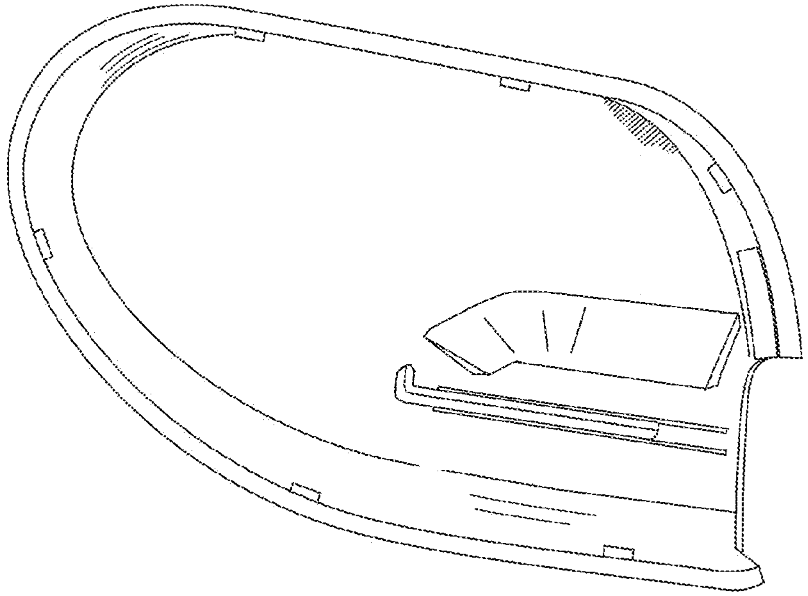
Figure 9:
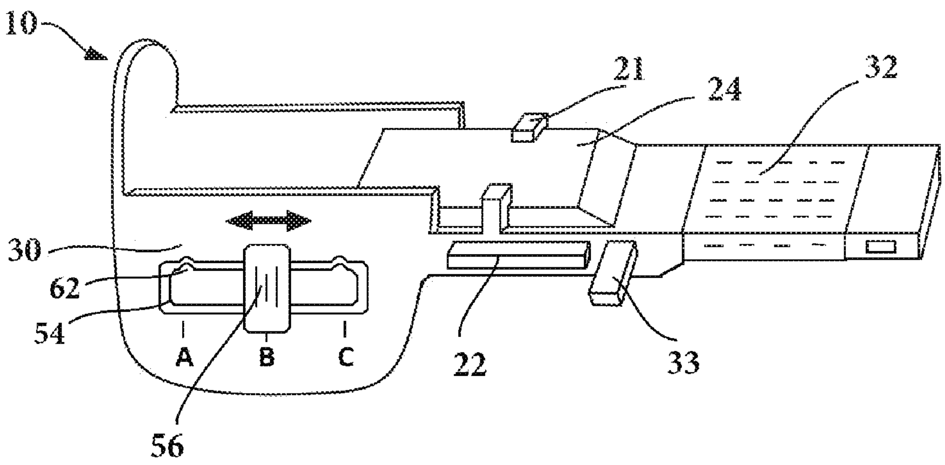
FIG. 9 is a detail perspective view illustrating the delivering structure.
Figure 10A:
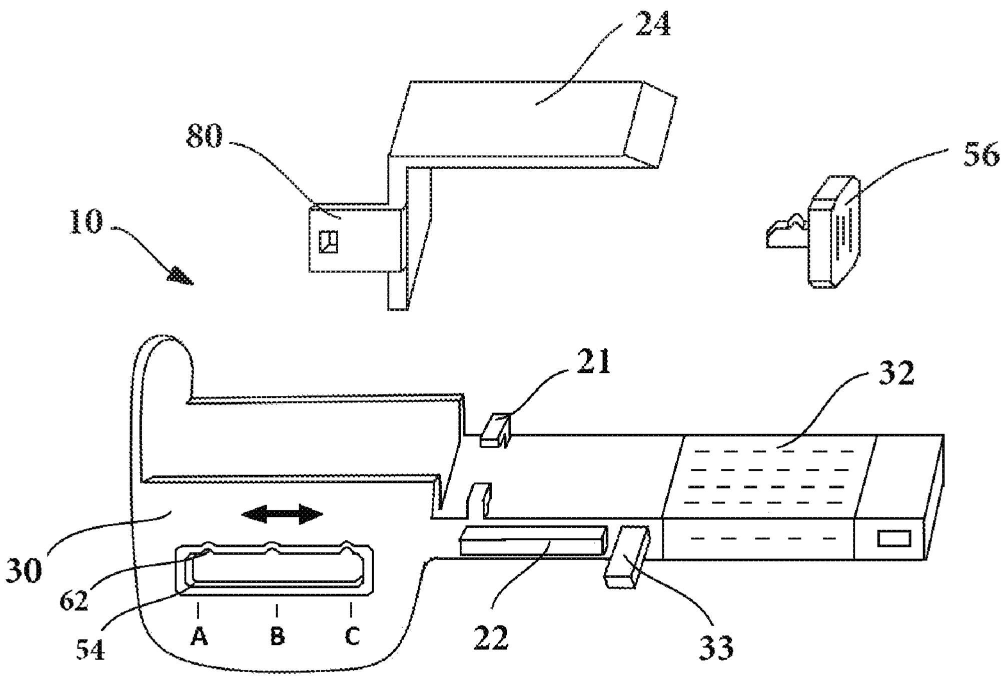
FIG. 10A is an exploded view of the delivering structure of FIG. 9.
Figure 10B:
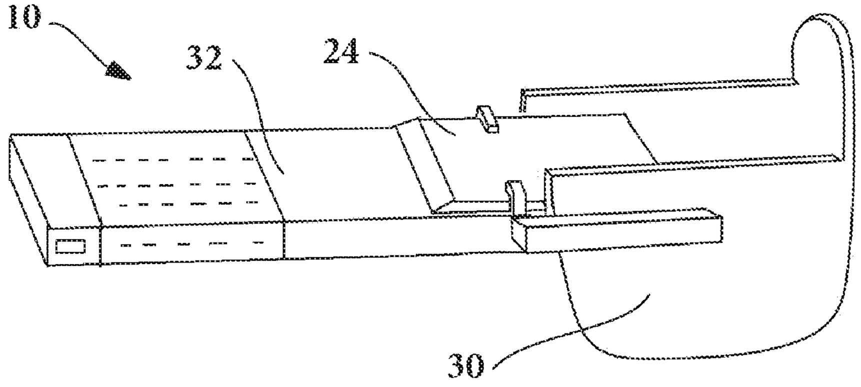
FIG. 10B is a perspective view illustrating the reserve side of the delivering structure of FIG. 9.

As shown in FIGS. 9 and 10, the delivering structure 10 may include the carrying holder 30, the baffle apparatus 32, the guide rails 22, the adjusting apparatus 24, the control button 56, and the control button groove 54. There are some detents 62 on the control button groove 54 for the adjusting apparatus 24 stopping in the predetermined positions. The catch portions 21 fixed on the baffle apparatus 32 to secure the adjusting apparatus 24. The carrying holder 30 is used for holding and carrying the tablets or pills 68. The adjusting apparatus 24 may be an L-shape plate with an arm 80. Part of the adjusting apparatus 24 may be situated on the baffle apparatus 32 and part of the adjusting apparatus 24 may be disposed in the carrying holder 30. One distal tip of the baffle apparatus 32 may connect to or be integrally formed with the rear of the carrying holder 30 in order to direct the tablets and pills of the storage chamber 55 toward the carrying holder 30 (see FIG. 4), another distal tip of the baffle apparatus 32 may be installed on the dispenser apparatus 6. In addition to the configuration provided in the figures, the carrying holder 30 alternatively may be configured as a non-lid box, a bucket or the like, etc. The carrying holder 30 may be transparent so that the user can observe its condition. In one aspect, guide rails 22 may be configured on the delivering structure 10 to complement and interface with guide grooves 46 (see FIG. 5) configured on the sides of the housing 8 to facilitate the delivering structure 10 reciprocate. The arm 80 may disposed on the adjusting apparatus 24 and may couple to a control button 56. The control button 56 may company with the delivering structure 10 situated in the rest chamber in the stowed configuration. The control button 56 of the adjusting apparatus 24 may reciprocate to change the dimension of the carrying holder 30 for carrying different size or pieces of the tablets or pills.

Figure 11:
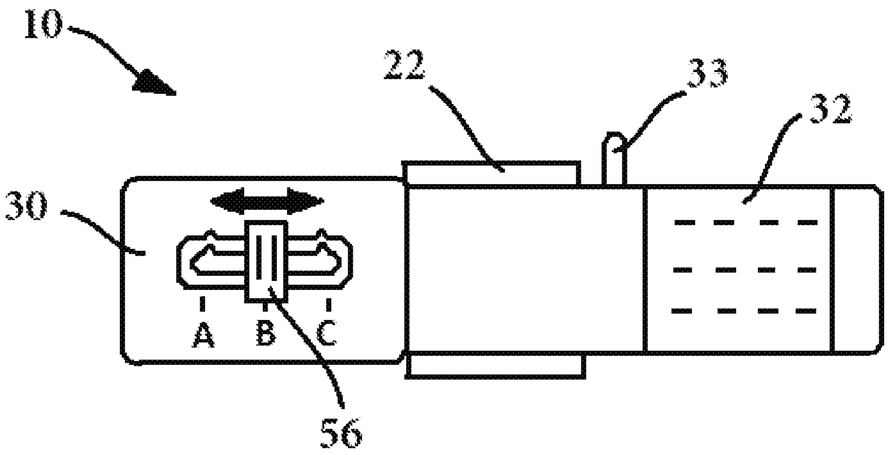
FIG. 11 is a perspective view illustrating a control apparatus disposed on the bottom of the delivering structure.
Figure 12A:
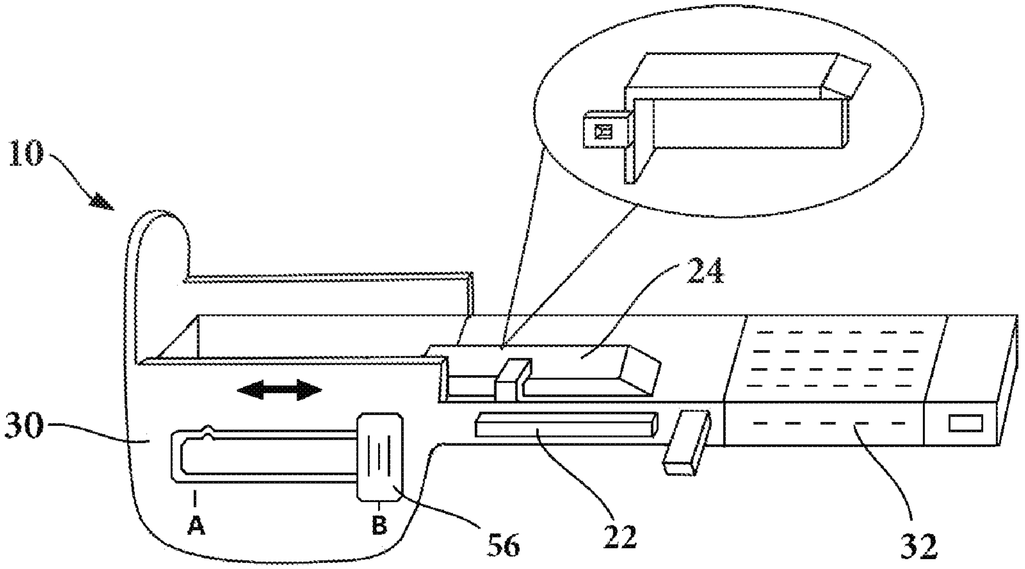
FIGS. 12A-12D are perspective view illustrating other aspects of the adjusting apparatus of the delivering structure.
Figure 12B:
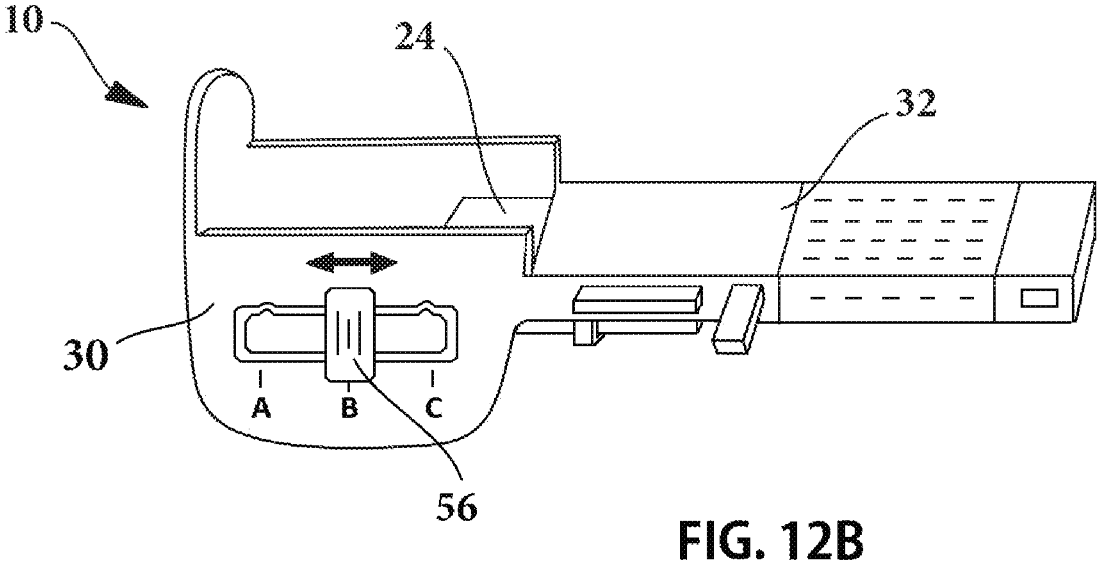
Figure 12C:
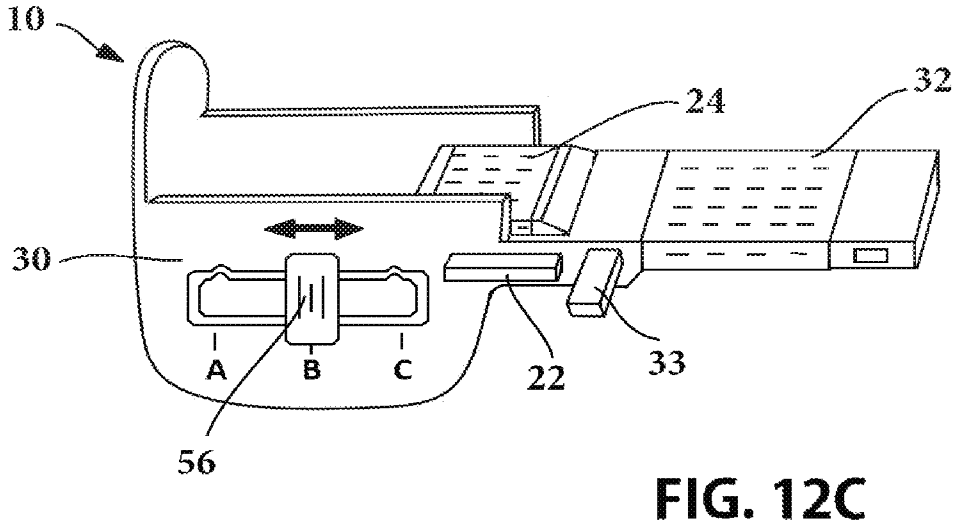
Figure 12D:
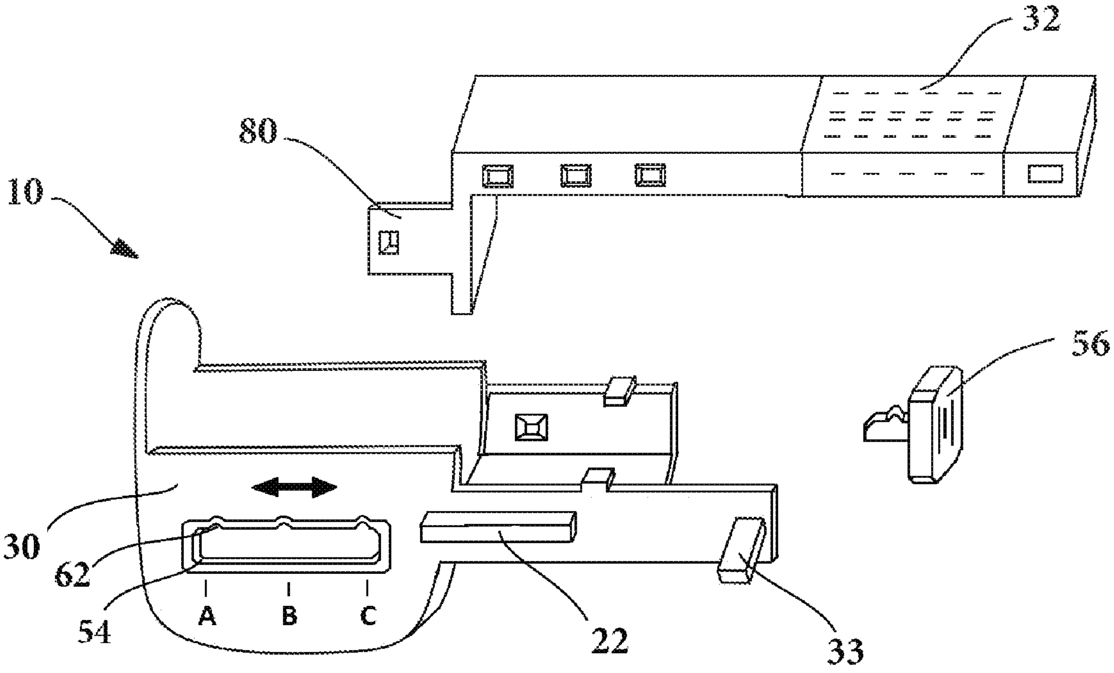
Figure 13A:
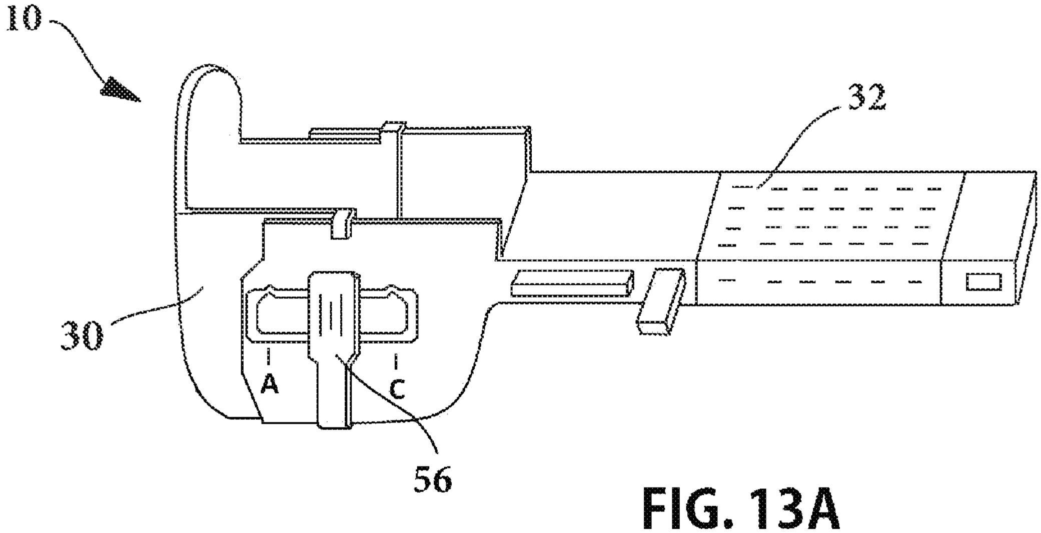
FIG. 13A is a perspective view illustrating another aspect of the carrying holder of the delivering structure.
Figure 13B:
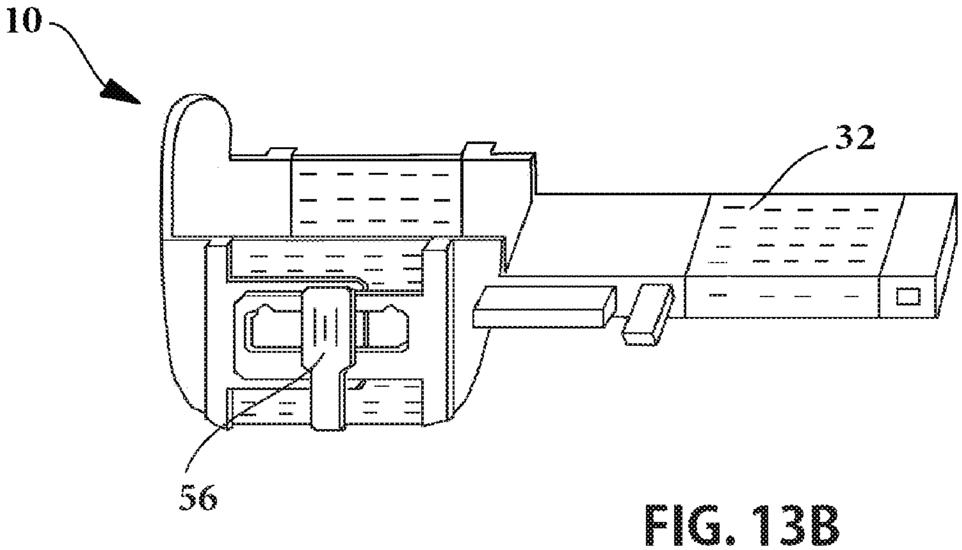
FIG. 13B is a perspective view illustrating still another aspect of the carrying holder of the delivering structure.

As shown in FIG. 9, the consumer may change the dimension of the carrying holder 30 for carrying different desired size or pieces of tablets and pills. It is within the teaching of the present disclosure that the delivering structure 10 may be formed of any suitable configurations and manners to provide the intended functionality which change the dimension of carrying holder 30. For example, as shown in FIG. 13A, the carrying holder 30 may be formed by two pieces of apparatus, and each piece of apparatus may seem like a part of the carrying holder 30, and these two part of the holder partly pile up together to form the carrying holder 30. A control apparatus 56 may engage the two pieces of apparatus reciprocate to change the dimension of the carrying holder 30. Additionally, as shown in FIG. 113B, party sidewalls of the carrying holder 30 may be formed of the elastic or flexible material, such as soft plastic rubber, etc. and a control apparatus 56 may engage the elastic and flexible sidewalls to extend or contract to change the dimension of the carrying holder 30 for carrying different size or pieces of small tablets or pills 58, or the like, etc. Furthermore, as shown in FIG. 12A, the adjusting apparatus 24 may be a narrow long L-shape plate to change the width dimension of the carrying holder 30. In another aspect, as shown in FIG. 12B, the adjusting apparatus 24 may be disposed below the baffle apparatus 32, and in FIG. 12C, part of the adjusting apparatus 24 may be made of the elastic and flexible material such as the soft plastic, rubber etc., and in FIG. 12D, the adjusting apparatus may merge with the baffle apparatus together. Moreover, as shown in the FIG. 11, the control button 56 may be configured on the bottom of carrying holder 30 or the like, etc.

Figure 14:
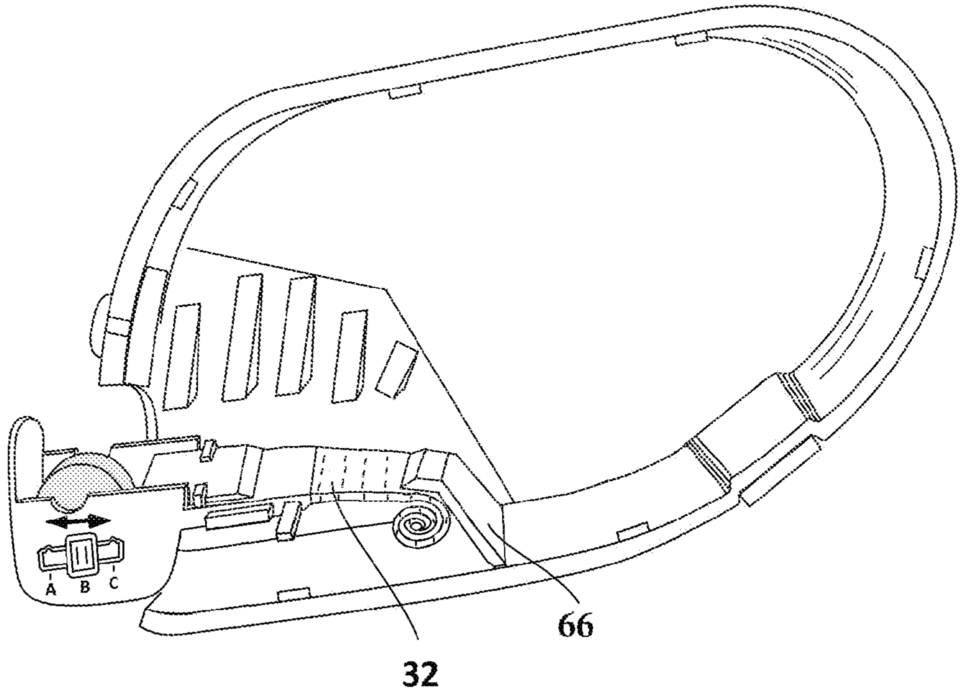
FIG. 14 is a perspective view illustrating a roll up baffle apparatus and the barrier apparatus.
Figure 15A:
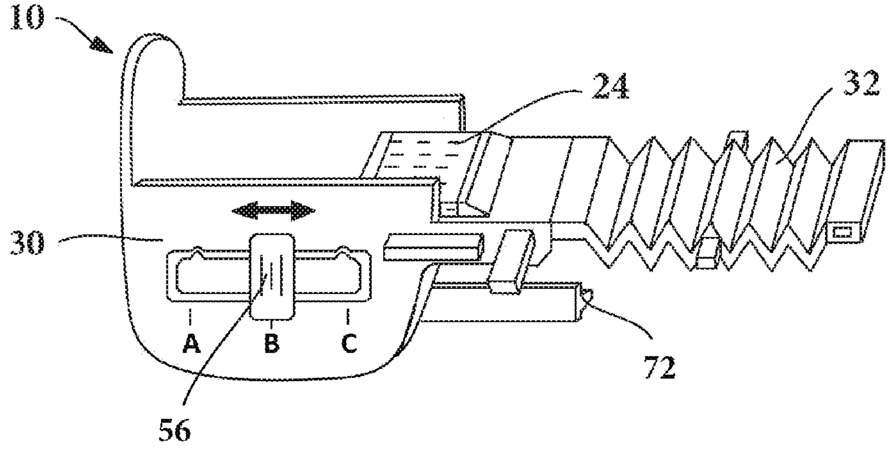
FIG. 15A is a perspective view illustrating another aspect of the baffle apparatus.
Figure 15B:
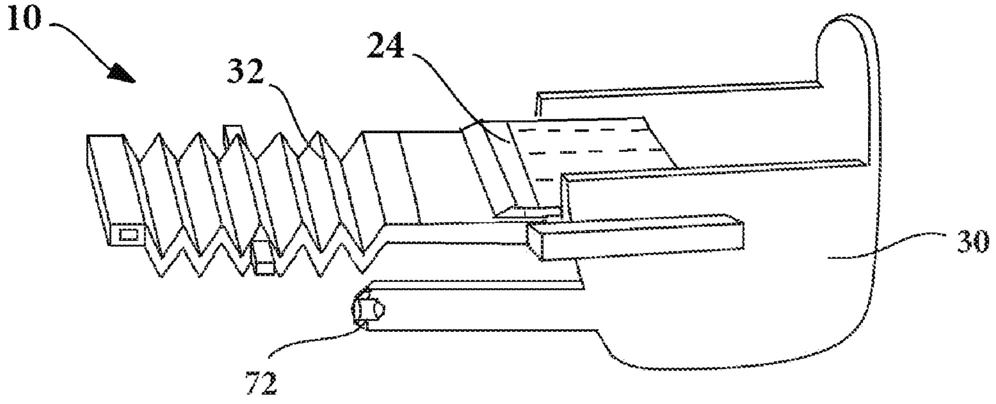
FIG. 15B is a perspective view illustrating the reserve side of another aspect of the baffle apparatus FIG. 15A.
Figure 16:
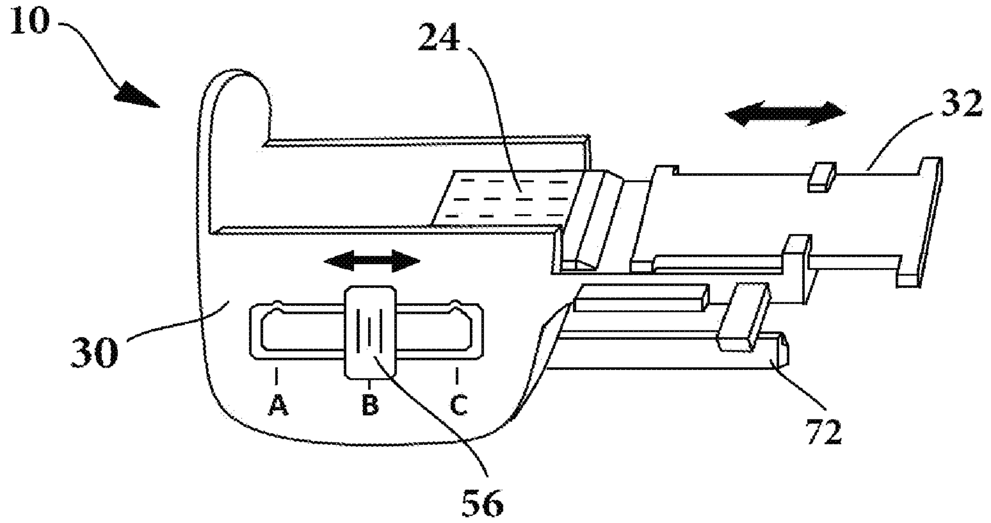
FIG. 16 is a perspective view illustrating still another aspect of the baffle apparatus.
Figure 17:
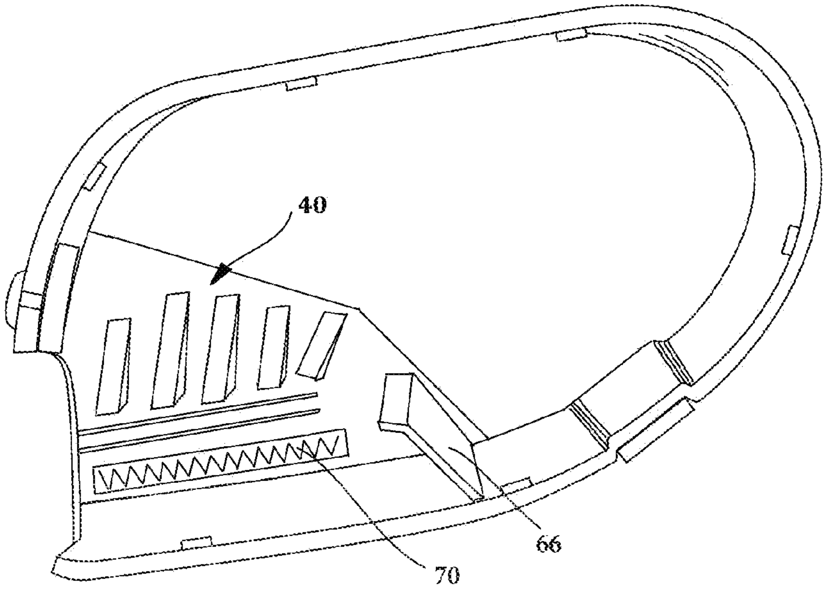
FIG. 17 is a perspective view illustrating a left half side of the dispenser apparatus with a spring.

Additionally, the baffle apparatus 32 may be configured in an extending and retracting configuration between long and short configurations, to ensure that the gap created by movement of the carrying holder 30 is covered. For example, in one configuration, part or all of the baffle apparatus 32 may be formed of the elastic and flexible material, such as soft plastic, rubber, nature or synthetic material etc. and when an external force actuates the delivering structure 10 to move from the stowed configuration to the dispensing configuration, the elastic part of the baffle apparatus 32 may extend, i.e., by stretching or expanding, for covering the gap caused by motion of the carrying holder 30, and when the external force is removed or canceled the elastic part of the baffle apparatus 32 may contract to facilitate the delivering structure 10 retreat back from the dispensing configuration to the stowed configuration. FIGS. 8-13B illustrate a baffle apparatus 32 configured in this manner. Because this embodiment may reduce the length of the baffle apparatus 32 or the length of the delivering structure 10 and enlarge the storage chamber 55 space for carrying more tablets and pills. It is within the teaching of the present disclosure that the baffle apparatus 32 may be formed of any suitable configurations and manners for the above intended functionality (i.e., extending and retracting), which permits shortening the length of the delivering structure 10 and enlarging the size of the storage chamber 55. In another embodiment, the baffle apparatus 32 may extend and retract by rolling. For example, as shown in FIG. 14, in the stowed configuration the baffle apparatus 32 may be disposed of a roll up configuration, like a self-retracting measure tape, with one distal tip connected to the carrying holder 30, and another distal tip may be connected directly or indirectly to the housing 8 (such as a rolling dispenser), with the tape rolled up, and a barrier apparatus 66 may be adjacent to the rolled up tape. When an external force actuates the delivering structure 10 to move from the stowed configuration to the dispensing configuration, the baffle apparatus 32 may stretch for covering the gap formed when the carrying holder 30 moves to dispensing position, and when the external force is cancel or removed the baffle apparatus 32 may roll up and facilitate the carrying holder 30 retreats back to the stowed position. In a further embodiment, the baffle apparatus 32 may be configured to extend and retract by folding, e.g., like an accordion door (FIGS. 15A & B), where one distal tip may connect to the holder 30, and another tip may be connected directly or indirectly to the housing 8. The baffle apparatus 32 folds together in the stowed position, and when an external force actuates the delivering structure 10 to move from the stowed configuration to the dispensing configuration, the baffle apparatus 32 may extend by unfolding for covering the gap formed when the carrying holder 30 moves to dispensing position, when the external force is removed the baffle apparatus 32 may contract or fold and facilitate the carrying holder 30 retreats back from the dispensing configuration to the stowed configuration. In this situation, a biasing mechanism such as a spring 70 and a spring hook 72 may be needed (see FIG. 17) to facilitate the delivering structure 10 automatically retreat back to the stowed configuration. In another embodiment, the baffle apparatus 32 may extend and retract by sliding. For example, as shown in FIG. 16, in the stowed configuration the baffle apparatus 32 may be configured to expand by a sliding configuration, e.g., two or more sliding parts that slide with respect to each other, and the two or more parts of the baffle apparatus 32 may pile up together in the stowed configuration. One distal tip connects the holder 30 and another tip is directly or indirectly connected to the housing 8, and a barrier apparatus 66 may follow, and when an external force engages the delivering structure 10 to move from the stowed configuration to the dispensing configuration, the baffle apparatus 32 may slide and stretch for covering the gap formed when the carrying holder 30 moves to dispensing position. In this configuration, a biasing mechanism such as a spring 70 and spring hook 72 may be needed (see FIG. 17), when the external force is moved, the spring 70 may facilitate the delivering structure 10 automatically retreat back to the stowed configuration, or the like, etc. It is understood that the biasing mechanism (e.g., spring 70) in FIG. 17 may be used with other embodiments described herein.

Figure 19:
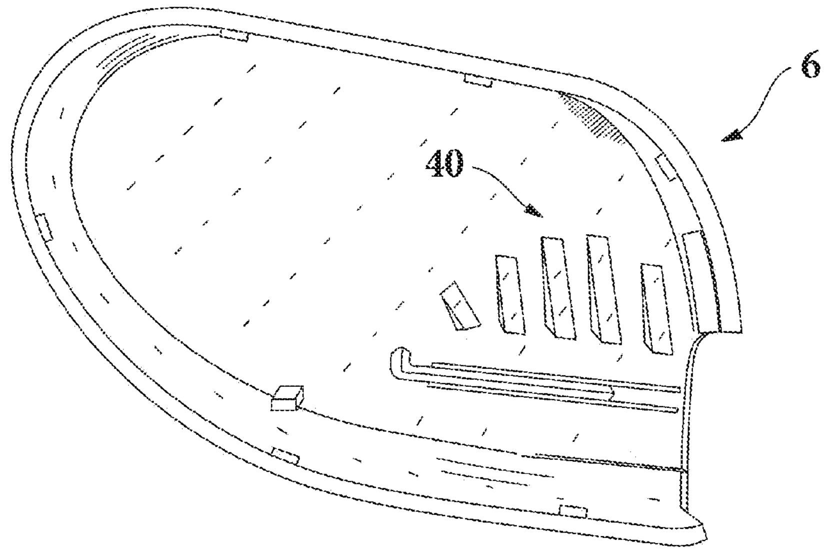
FIG. 19 is a perspective view illustrating the coat inside of the dispenser apparatus.
Figure 19:
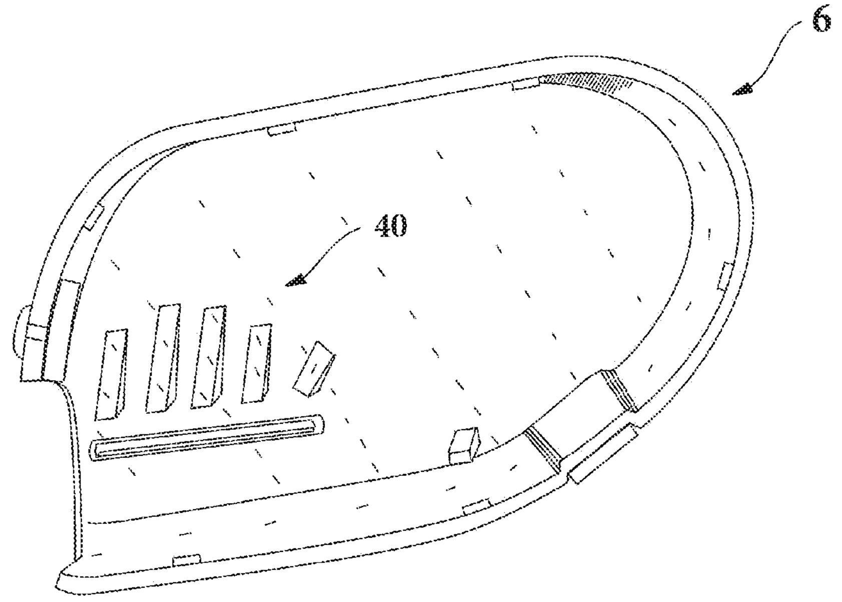

In one aspect, in order to reduce or eliminate the noise engaged during operating the dispenser, a thin layer of lower durometer hardness material may be coated or sprayed on the inside walls of the dispenser container (see FIG. 19).

Figure 18:
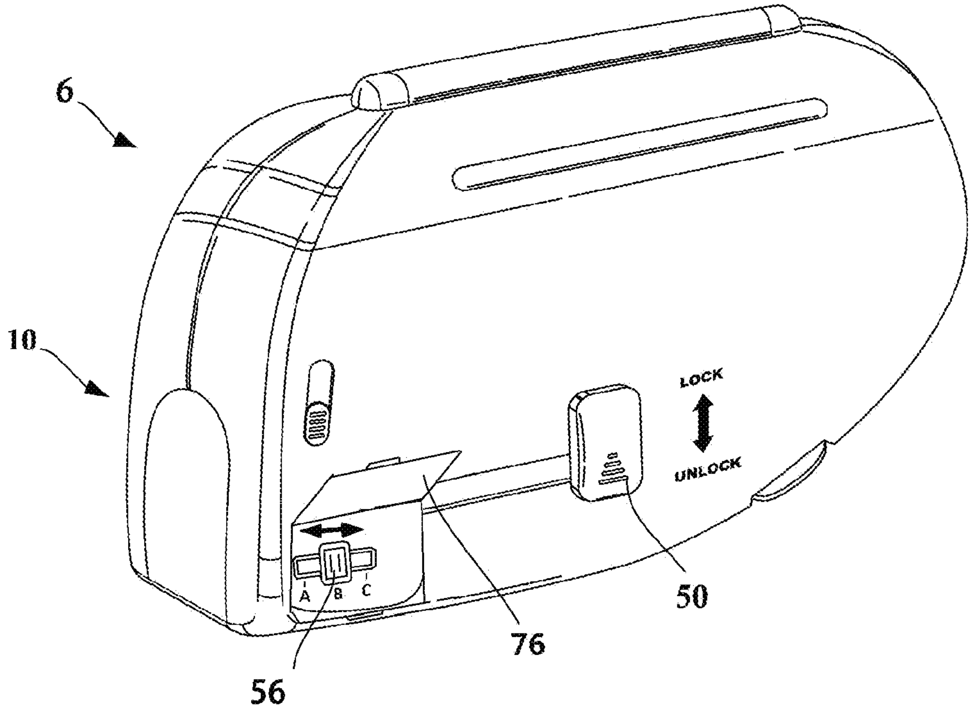
FIG. 18 is a perspective view illustrating a second lid of the dispenser apparatus.

As shown in FIG. 18, a second lid 76 of the dispenser may be disposed on the housing 8, open the lid the consumer may directly engage the button 56 of the adjusting apparatus 24.

Various embodiments of dispensing apparatuses have been described herein, which include various components and features. In other embodiments, the dispensing apparatus may be provided with any combination of such components and features. It is also understood that in other embodiments, the various devices, components, and features of the dispensing apparatus described herein may be constructed with similar structural and functional elements having different configurations, including different ornamental appearances.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. It is also understood if all elements or steps which are insubstantially different from the art in the claims but fulfill the substantially same functions, respectively, in substantially the same way to acquire the same result as what is claimed are within the scope of the disclosure. The present examples and embodiments, therefore, are to be considered in all respects as illustrative and not restrictive, and the invention is not to be limited to the details given herein. The terms "top," "bottom." "front," "back," "side," "rear." "proximal," "distal." and the like, as used herein, are intended for illustrative purposes only and do not limit the embodiments in any way. When used in description of a method or process, the term "providing" (or variations thereof) as used herein means generally making an article available for further actions, and does not imply that the entity "providing" the article manufactured, assembled, or otherwise produced the article. Nothing in this specification should be construed as requiring a specific three dimensional orientation of structures in order to fall within the scope of this invention, unless explicitly specified by the claims. Additionally, the term "plurality," as used herein, indicates any number greater than one, either disjunctively or conjunctively, as necessary, up to an infinite number. Accordingly, while the specific embodiments have been illustrated and described, numerous modifications come to mind without significantly departing from the spirit of the invention and the scope of protection is only limited by the scope of the accompanying claims.

What is claimed is:

1. An apparatus configured to dispense one or more small items, the apparatus comprising:

a container comprising a storage chamber configured to hold the one or more small items, and an exit opening in communication with the storage chamber; and a delivery member comprising a carrying holder configured for receiving the one or small items, an adjusting apparatus configured to move between a plurality of positions to adjust at least one dimension of the carrying holder, and a control apparatus connected to the adjusting apparatus and configured to be engaged by a user, wherein the control apparatus is moveable to cause movement of the adjusting apparatus between the plurality of positions, thereby adjusting the at least one dimension of the carrying holder, wherein the delivery member is configured to move in a reciprocating motion between a stowed configuration, where the carrying holder is within the container and configured to receive the one or more small items from the storage chamber, and a dispensing configuration, where the delivery member extends through the exit opening and the carrying holder is configured to dispense the one or more small items, by exertion of an exterior force by the user, and wherein when the delivery member is in the stowed configuration, the control apparatus is positioned within the container, and when the delivery member is in the dispensing configuration, the control apparatus is positioned outside of the container, and the control apparatus is exposed so that the user can engage the control apparatus to adjust the at least one dimension of the carrying holder, wherein the control apparatus comprises a button moveable within a slot on a side of the carrying holder, and the button is engaged with the adjusting apparatus such that the button is configured to be moveable along the slot to cause movement of the adjusting apparatus to adjust the at least one dimension of the carrying holder.

2. The apparatus of claim 1, wherein the adjusting apparatus comprises a moveable member forming a boundary of the carrying holder, wherein the moveable member is moveable to adjust at least one dimension of the carrying holder, wherein the control apparatus is connected to the moveable member of the adjusting apparatus, such that the control apparatus is moveable to cause movement of the adjusting apparatus, and the control apparatus is configured to be engaged by a user to move the moveable member of the adjusting apparatus and thereby adjust the at least one dimension of the carrying holder.

3. The apparatus of claim 1, further comprising a funnel apparatus positioned within the container, wherein when the delivery member is in the stowed configuration, the funnel apparatus is configured to permit the one or more small items to move through the funnel apparatus into the carrying holder of the delivery member, and wherein the delivery member comprises a push button configured for pushing the delivery member to the dispensing configuration.

4. The apparatus of claim 1, further comprising a biasing mechanism biasing the delivery member to the stowed configuration.

5. The apparatus of claim 1, wherein at least a portion of the carrying holder is formed by an elastic material.

6. The apparatus of claim 1, further comprising a cover hingedly coupled to the storage chamber, wherein opening the cover allows for refilling the one or more small items into the storage chamber.

* * * * *